(12) United States Patent
Westhues

(10) Patent No.: US 8,564,565 B2
(45) Date of Patent: Oct. 22, 2013

(54) REDUCTION OF NOISE IN TOUCH SENSORS

(75) Inventor: Jonathan Westhues, Brooklyn, NY (US)

(73) Assignee: Perceptive Pixel Inc., New York, NY (US)

( * ) Notice: Subject to any disclaimer, the term of this patent is extended or adjusted under 35 U.S.C. 154(b) by 155 days.

(21) Appl. No.: 13/298,622

(22) Filed: Nov. 17, 2011

(65) Prior Publication Data

US 2012/0223911 A1 Sep. 6, 2012

Related U.S. Application Data

(60) Provisional application No. 61/448,502, filed on Mar. 2, 2011.

(51) Int. Cl.
G09G 5/00 (2006.01)

(52) U.S. Cl.
USPC ........ 345/173; 345/174; 345/178; 178/18.01; 178/18.06

(58) Field of Classification Search
USPC ..................... 345/173–178; 178/18.01–18.06
See application file for complete search history.

(56) References Cited

U.S. PATENT DOCUMENTS

| | | | |
|---|---|---|---|
| 4,672,154 A | 6/1987 | Rodgers et al. | |
| 5,606,346 A | 2/1997 | Kai et al. | |
| 6,002,389 A | 12/1999 | Kasser | |
| 8,400,427 B2 * | 3/2013 | Perski et al. | 345/174 |
| 2002/0185981 A1 | 12/2002 | Dietz et al. | |
| 2002/0185999 A1 | 12/2002 | Tajima et al. | |
| 2003/0063073 A1 | 4/2003 | Geaghan et al. | |
| 2006/0161870 A1 | 7/2006 | Hotelling et al. | |
| 2006/0161871 A1 | 7/2006 | Hotelling et al. | |

(Continued)

FOREIGN PATENT DOCUMENTS

| | | |
|---|---|---|
| EP | 1956469 A2 | 8/2008 |
| EP | 2024974 A2 | 4/2009 |
| GB | 2428094 A | 1/2007 |
| WO | WO9718528 A1 | 5/1997 |

OTHER PUBLICATIONS

Uchimura et al., "Oversampling A-to-D and D-to A Converters with Multistage Noise Shaping Modulators," IEEE Transactions on Acoustics, Speech, and Signal Processing, vol. 36, No. 12, Dec. 1, 1988, 10 pages.

(Continued)

Primary Examiner — Kevin M Nguyen
Assistant Examiner — Jennifer Nguyen
(74) Attorney, Agent, or Firm — Alleman Hall McCoy Russell & Tuttle LLP

(57) ABSTRACT

Techniques are described for providing a cleaned signal in a capacitive touch sensor. A phase of periodic noise on an input of the capacitive touch sensor is determined, and a periodic excitation signal having a phase that is locked to the determined phase of the periodic noise is generated. The periodic excitation signal is applied to an excited conductor in a first array of the touch sensor. While the excitation signal is applied, a response signal on a responding conductor in a second array of the touch sensor is detected, and, based on the detected response signal, a value indicative of a measured capacitance between the excited conductor and the responding conductor is generated. A threshold value is accessed, and a determination is made whether the response signal corresponds to a touch based on a difference between the value and the threshold value.

85 Claims, 9 Drawing Sheets

(56) References Cited

U.S. PATENT DOCUMENTS

| | | | |
|---|---|---|---|
| 2008/0309622 A1* | 12/2008 | Krah | 345/173 |
| 2009/0009483 A1 | 1/2009 | Hotelling et al. | |
| 2009/0127005 A1 | 5/2009 | Zachut et al. | |
| 2009/0135148 A1 | 5/2009 | Bytheway | |
| 2009/0244029 A1 | 10/2009 | Huang et al. | |
| 2009/0284495 A1 | 11/2009 | Geaghan et al. | |
| 2010/0026664 A1 | 2/2010 | Geaghan | |
| 2010/0060593 A1 | 3/2010 | Krah | |
| 2010/0073325 A1 | 3/2010 | Yang | |
| 2010/0085326 A1 | 4/2010 | Anno | |
| 2010/0107099 A1 | 4/2010 | Frazier et al. | |
| 2010/0144391 A1 | 6/2010 | Chang et al. | |
| 2010/0156805 A1 | 6/2010 | Brand et al. | |
| 2011/0157069 A1* | 6/2011 | Zhuang et al. | 345/174 |

OTHER PUBLICATIONS

Notification of Transmittal of International Search Report and the Written Opinion of the International Searching Authority, or the Declaration dated Jan. 6, 2012 from International Application No. PCT/US2011/043935, 13 pages.

Notification of Transmittal of International Search Report and the Written Opinion of the International Searching Authority, or the Declaration dated Dec. 21, 2011 from International Application No. PCT/US2011/043936, 16 pages.

Invitation to Pay Additional Fees and, where Applicable, Protest Fee, including Communication Relating to the Results of the Partial International Search dated Dec. 20, 2011 from International Application No. PCT/US2011/043937, 9 pages.

Invitation to Pay Additional Fees and, where Applicable, Protest Fee, including Communication Relating to the Results of the Partial International Search dated Dec. 22, 2011 from International Application No. PCT/US2011/047844. 9 pages.

Notification of Transmittal of International Search Report and the Written Opinion of the International Searching Authority, or the Declaration dated Mar. 6, 2012 from International Application No. PCT/2011/043937, 19 pages.

Notification of Transmittal of International Search Report and the Written Opinion of the International Searching Authority, or the Declaration dated Mar. 6, 2012 from International Application No. PCT/2011/047844, 24 pages.

Notification of Transmittal of International Search Report and the Written Opinion of the International Searching Authority, or the Declaration dated May 15, 2012 from International Application No. PCT/2012/023915, 15 pages.

DiamondTouch by Circle Twelve, downloaded from the internet on Aug. 27, 2010, at http://circletwelve.com/products/howitworks.html , 2 pages.

* cited by examiner

REDUCTION OF NOISE IN TOUCH SENSORS

CROSS REFERENCE TO RELATED APPLICATIONS

The present application claims the benefit of U.S. Provisional Application No. 61/448,502, filed Mar. 2, 2011, which is incorporated herein by reference in its entirety for all purposes.

TECHNICAL FIELD

This disclosure relates to techniques for reducing noise in touch sensors.

BACKGROUND

Touch-sensitive systems detect and respond to one or more points of contact on a surface. A touch-sensitive system may be incorporated within an electronic device in the form of a touch screen display that allows a user to both view and manipulate objects using one or more inputs that contact the screen.

SUMMARY

This specification describes technologies generally related to reduction or rejection of noise in touch sensors.

In general, some aspects of the subject matter described in this specification can be implemented in methods that involve a sensor. Other implementations of this aspect include corresponding systems, apparatus, and computer programs configured to perform the actions of the methods. The computer programs being encoded on computer storage devices.

In general, another aspect of the subject matter described in this specification can be implemented in methods that include actions related to providing a cleaned signal in a capacitive touch sensor. The capacitive touch sensor includes a first array of conductors and a second array of conductors. The conductors in the first array are arranged substantially in parallel with one another, and the conductors in the second array are arranged substantially in parallel with one another. The conductors in the first array are positioned substantially perpendicular to the conductors in the second array to form a matrix. A phase of periodic noise on an input of the capacitive touch sensor is determined, and a periodic excitation signal having a phase that is locked to the determined phase of the periodic noise is generated. The periodic excitation signal is applied to an excited conductor in the first array. While the excitation signal is applied, a response signal on a responding conductor in the second array is detected, and, based on the detected response signal, a value indicative of a measured capacitance between the excited conductor and the responding conductor is generated. A threshold value is accessed, and a determination is made whether the response signal corresponds to a touch based on a difference between the value and the threshold value; and a signal reflecting results of the determination of whether the response signal corresponds to a touch is produced.

These and other implementations can each optionally include one or more of the following features. Determining whether the response signal corresponds to a touch can include determining whether the response signal corresponds to an input mechanism being in such physical proximity to the matrix that the input mechanism, by virtue of its proximity to the matrix, imparts a capacitance change between the excited conductor and the responding conductor. Determining whether the response signal corresponds to a touch can include determining whether the response signal corresponds to an input mechanism being in direct physical contact with the matrix such that a capacitance change occurs between the excited conductor and the responding conductor.

Generating a periodic excitation signal having a phase locked to the determined phase of the periodic noise can include generating a periodic excitation signal such that a phase difference between the generated periodic excitation signal and the periodic noise is kept constant in time.

The threshold value can be determined during calibration of the capacitive touch sensor and can include a constant offset that reflects the effect of the periodic noise on the response signal. The touch sensor can be calibrated to determine the threshold value.

Detecting a response signal on a responding conductor in the second array can include detecting the response signal using a detector that is deterministic and maintains no state across sensor frames. Generating, based on the detected response signal, a value indicative of a measured capacitance between the excited conductor and the responding conductor can include: the detector generating a detector signal based on the response signal, and sampling the detector signal to arrive at the value indicative of a measured capacitance between the excited conductor and the responding conductor. A frequency selective filter can be used to filter out noise from the response signal and then providing the filtered response signal to the detector for generating the detector signal. Using the frequency selective filter to filter out noise may include using the frequency selective filter to filter out noise having a frequency lower than a frequency of the periodic excitation signal, and/or using the frequency selective filter to filter out noise having a frequency higher than a frequency of the periodic excitation signal.

The detector can include a peak detector circuit that detects a peak of the response signal, and generating the detector signal can include the peak detector circuit generating a signal reflecting the peak of the response signal.

The detector can include a correlation detector circuit that computes a correlation between the response signal and an expected response signal, and generating the detector signal can include the correlation detector circuit generating a signal reflecting the correlation between the response signal and the expected response signal.

The excitation signal can be a voltage, and the response signal can be a current. The detector can further include an amplifier that converts the current response signal to a current, a voltage, a digital code or another quantity. Generating the detector signal based on the response signal can include: converting, by the amplifier, the current response signal to a current, a voltage, a digital code or other quantity, and generating the detector signal by the detector detecting the current, the voltage, the digital code or the other quantity over time. The amplifier can be a transimpedance amplifier configured to convert the current response signal to a voltage that is then detected over time by the detector.

Sampling the detector signal to arrive at the value indicative of a measured capacitance between the excited conductor and the responding conductor can include sampling the detector signal during a measurement period of a sensor frame. A sample of the detector signal is taken at a same point in time during each measurement period of multiple sensor frames, and the measurement period of each of the multiple sensor frames can be in phase with the periodic excitation signal such that the sample of the detector signal is taken at a same phase of the periodic excitation signal during each sensor frame.

The touch sensor can be positioned relative to a display device and noise coupled from that display device can be periodic over the line-scan frequency or frame frequency of the display device. Determining the phase of the periodic noise can include receiving a synchronization signal from the display device, and determining the phase of the periodic noise based on the synchronization signal. Generating the periodic excitation signal can include using the synchronization signal to lock the phase of the generated periodic excitation signal to the phase of the periodic noise. The synchronization signal can be a line synchronization signal or a frame synchronization signal of the display device. The display device can be a liquid crystal display device, an OLED (organic light-emitting diode) display device, or a plasma display device.

The threshold value can be determined during a calibration routine of the sensor, and can be stored in a data store. The threshold value can be accessed from the data store. The calibration routine during which the threshold value is determined can be performed when the sensor is manufactured, and/or can be performed only once during the lifetime of the sensor.

In general, another aspect of the subject matter described in this specification can be implemented in methods that include actions related to providing a cleaned signal in a capacitive touch screen display having a capacitive touch sensor positioned relative to a display device. The capacitive touch sensor includes a first array of conductors and a second array of conductors. The conductors in the first array are arranged substantially in parallel with one another, and the conductors in the second array are arranged substantially in parallel with one another. The conductors in the first array are positioned substantially perpendicular to the conductors in the second array to form a matrix. A synchronization signal is received from the display device. The touch sensor is configured to have a sensor frame rate equal to a rational multiple of a frame rate of the display device, and a phase of periodic noise generated by the display device is determined based on the synchronization signal. During a first sensor frame of the touch sensor, a first periodic excitation signal having a phase that is locked to the determined phase of the periodic noise is generated, and the first periodic excitation signal is applied to an excited conductor in the first array. While the first excitation signal is applied during the first sensor frame, a first response signal is detected on a responding conductor in the second array. The responding conductor is capacitively coupled to the excited conductor, and, based on the detected first response signal, a first value indicative of a measured capacitance between the excited conductor and the responding conductor is generated. A first threshold value is accessed, and a determination is made whether the first response signal corresponds to a touch based on a difference between the first value and the first threshold value. A signal reflecting results of the determination of whether the first response signal corresponds to a touch is produced.

These and other implementations can each optionally include one or more of the following features. Configuring the touch sensor to have a sensor frame rate equal to a rational multiple of the frame rate of the display device can include configuring the touch sensor to have a ratio of the sensor frame rate to the frame rate of the display device that is equal to x:y, where x and y are integers and x is greater than one. During a second sensor frame of the touch sensor that occurs after the first sensor frame, a second periodic excitation signal having a phase that is locked to the determined phase of the periodic noise can be generated, and the second periodic excitation signal can be applied to the excited conductor. While the second excitation signal is applied during the second sensor frame, second response signal on the responding conductor is detected, and based on the detected second response signal, a second value indicative of a measured capacitance between the excited conductor and the responding conductor is generated. A second threshold value that is different from the first threshold value is accessed. A determination is made whether the second response signal corresponds to a touch based on a difference between the second value and the second threshold value, and a signal reflecting results of the determination of whether the second response signal corresponds to a touch is produced.

The first threshold value and the second threshold value can be determined during a calibration routine of the sensor, and the first threshold value and the second threshold value can be stored in a data store. Accessing the first threshold value can include accessing the first threshold value from the data store, and accessing the second threshold value can include accessing the second threshold value from the data store. The calibration routine during which the first threshold value and the second threshold value are determined can be performed when the sensor is manufactured and/or can be performed only once during the lifetime of the sensor.

Generating, based on the detected second response signal, a second value indicative of a measured capacitance between the excited conductor and the responding conductor can include: generating a second detector signal based on the second response signal, and sampling the second detector signal to arrive at the second value indicative of a measured capacitance between the excited conductor and the responding conductor.

In general, another aspect of the subject matter described in this specification can be implemented in methods that include actions related to providing cleaned signals in a capacitive touch screen display having a capacitive touch sensor positioned relative to a display device. The capacitive touch sensor includes a first array of conductors and a second array of conductors. The conductors in the first array are arranged substantially in parallel with one another, and the conductors in the second array are arranged substantially in parallel with one another. The conductors in the first array are positioned substantially perpendicular to the conductors in the second array to form a matrix. A synchronization signal is received from the display device, and the touch sensor is configured to have a ratio of a sensor frame rate to a frame rate of the display device that is equal to x:y, where x and y are integers and x is greater than one. A phase of periodic noise generated by the display device is determined based on the synchronization signal. x threshold values are stored in a data store, each of the x threshold values usable for determining touches during a respective one of x sequential sensor frames. During each nth sensor frame of the x sequential sensor frames, where n is an integer from 1 to x: an nth periodic excitation signal having a phase that is locked to the determined phase of the periodic noise is generated and applied to an excited conductor in the first array. While the nth excitation signal is applied during the nth sensor frame, an nth response signal on a responding conductor in the second array is detected. The responding conductor is capacitively coupled to the excited conductor. Based on the detected nth response signal, an nth value indicative of a measured capacitance between the excited conductor and the responding conductor is generated. An nth threshold value is accessed from the data store. A determination is made whether the nth response signal corresponds to a touch based on a difference between the nth value and the nth threshold value, and a signal reflecting results of the determination of whether the nth response signal corresponds to a touch is produced.

These and other implementations can each optionally include one or more of the following features. At least two of the x threshold values can be different from each other. Each of the x threshold values can be different from each other.

Generating, based on the detected nth response signal, an nth value indicative of a measured capacitance between the excited conductor and the responding conductor can include: generating an nth detector signal based on the nth response signal; and sampling the nth detector signal to arrive at an nth value indicative of a measured capacitance between the excited conductor and the responding conductor.

The x threshold values can be determined during a calibration routine of the sensor. The calibration routine can be performed when the sensor is manufactured, and/or performed only once during the lifetime of the sensor.

The details of one or more implementations of the subject matter described in this specification are set forth in the accompanying drawings and the description below. Other features and aspects of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
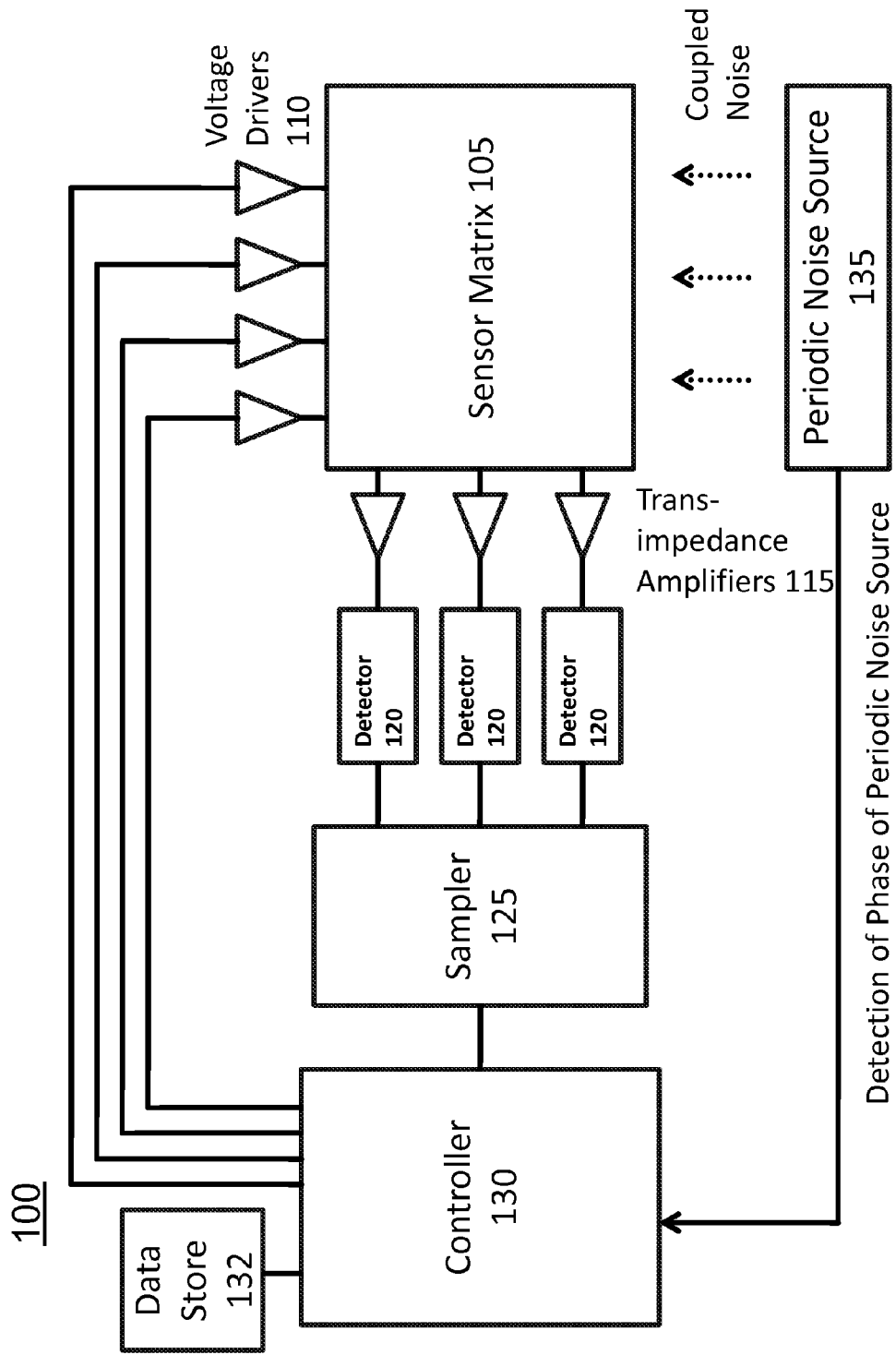
FIG. 1 is a diagram of a touch sensor system having improved noise reduction capabilities.

A touch sensor may include conducting rows and columns, arranged in a two-dimensional grid or matrix. The specific geometry of the row and column conductors may vary according to the conducting material used to realize them. For example, the rows and columns may be arranged in a diamond pattern, with indium tin oxide as the conducting material; or the rows and columns may be formed using metal wires (e.g., copper or silver wires) sufficiently thin to be inconspicuous when the touch sensor is placed in front of a display. Some touch sensors determine whether a finger (or other input mechanism, such as, for example, a stylus) is "touching" a particular location in the matrix by measuring a capacitance from the row at that position to the column at that position. Notably, the input mechanism may, but need not, be in physical contact with the matrix to "touch" the matrix. Rather, the input mechanism need only be in such physical proximity to the matrix to impart a change in capacitance at a position on the matrix. As such, it should be understood that the following disclosure's reference to "touch" need not require direct physical contact but rather more generally requires that an input mechanism engage the matrix (e.g., by being in direct physical contact or in close physical proximity to the matrix) such that a change in capacitance is imparted at a position on the matrix by the input mechanism. The change in capacitance can then be measured to determine the existence of the touch.

The capacitance measurement may be made by applying a time-varying voltage to the column, and measuring the resulting current coupled capacitively to the row. This current may be proportional to the capacitance from the row to the column. Because a touch may result in an increase or a decrease in capacitance at the touched location, determination of whether the particular location in the matrix is being touched is possible by comparing the measured capacitance to a baseline value (e.g., an example of a threshold value). Accordingly, if the measured capacitance deviates from the baseline value by a predetermined amount, the touch sensor concludes that the particular location is being touched. Conversely, if the measured capacitance does not deviate from the baseline value by the predetermined amount, the touch sensor concludes that the particular location is not being touched. The predetermined amount of deviation that is indicative of a touch depends on the geometry and other details of the sensor. Software or electronics within the touch sensor controller may typically maintain a table of the baseline capacitance at each location in the matrix (i.e., at each row-column intersection), and may compute the increase or decrease in capacitance with respect to that baseline.

In some implementations, a touch sensor measures capacitances at each row-column intersection of the touch sensor matrix in a column-by-column manner by sequentially applying a time-varying excitation voltage to each column in the matrix and measuring the row currents. When a time-varying excitation voltage is applied to a particular column in the matrix (i.e., the test column), all of the other columns in the matrix may be held at a constant voltage, and all of the rows in the matrix also may be held at a constant voltage. By keeping the rows and the other columns at a constant voltage when the particular column is being tested, the measurement of the capacitances at each intersection of a row with the column under test may be independent of any other capacitances. In this manner, the capacitances at the locations in the matrix where each row intersects with the column under test may be measured. By sequentially testing each of the remaining columns in the matrix while measuring the corresponding row currents, a bitmap image may be generated where changes in capacitance at a particular location in the matrix indicate a touch at that particular location. This situation may be practically achieved by connecting each row to a transimpedance amplifier, or another circuit that holds its input voltage constant while measuring the current into that input. In the case of a transimpedance amplifier, the circuit's output may be a voltage, but in the case of other circuits, that output may be a current, digital code, or other quantity.

The ability of a touch sensor to accurately detect touches and to determine the locations of touches is limited by noise. That is, some current may flow into all rows at all times due to noise. The word "noise" is used herein to refer to any undesired signal, regardless of whether its characteristics are entirely stochastic, or whether the signal has some periodic or other structure. The latter signals are sometimes referred to separately, as "interference", but this distinction is not made here.

The ratio of the noise current to the current that arises from the excitation voltage may determine the touch sensor's signal to noise ratio. The performance of the touch sensor may, therefore, be limited by the signal to noise ratio of the capacitance measurement. If the noise amplitude exceeds the amplitude of the capacitance change caused by a touch, then the system may report false touch events, or may disregard real touch events. To the extent that the position (x, y) of the touch is calculated with spatial resolution better than the pitch of the matrix by interpolation, noise on the measured capacitances will result in noise on the calculated position.

As described in further detail below, a touch sensor system may reduce the negative impact of periodic noise on sensor performance by detecting or otherwise determining the phase of the periodic noise and modifying the voltage drivers of the sensor to apply time-varying excitation voltages having phases that are locked to the determined phase of the periodic noise. The locking of the phases of the time-varying excitation voltages to the phase of the detected noise allows the effect of the periodic noise to be converted into a fixed offset that can then be subtracted from the capacitance measurement during a subsequent calibration step to compensate for the effect of the periodic noise on the capacitance measurement.

FIG. 1 is a diagram of a touch sensor system 100 having improved noise reduction capabilities. The touch sensor system 100 includes a sensor matrix 105 that includes a set of rows and columns. The system 100 further includes a column voltage driver 110 for each column of the sensor matrix 105. The voltage drivers 110 are electronic circuits configured to switch between applying a fixed voltage and applying an excitation voltage to their corresponding column based on whether the column is currently being tested. The system 100 also includes a transimpedance amplifier 115 and a detector 120 for each row of the sensor matrix 105. Notably, the designation of one axis as the rows, and the other axis as the columns, may be chosen arbitrarily, or reversed with no fundamental change in the touch sensor system 100.

The transimpedance amplifiers 115 convert row currents into voltages that can then be detected by the detectors 120. The detector 120 is configured to detect the voltage over time received from the transimpedance amplifiers 115 and convert the voltage into a signal that can be subsequently sampled by a sampler 125 to render a number indicative of the capacitance between the row and the column under test. In other implementations, the transimpedance amplifiers 115 are included as part of the detector 120. In some implementations, the transimpedance amplifiers 115 are replaced by current input amplifiers that each hold their input voltage constant while measuring the row current and that output a current, a digital code, or another quantity, instead of a voltage. The outputted other quantity may then be detected by the detector 120 over time and then sampled by the sampler 125 to render a number indicative of the above-noted capacitance. At some point before or after one or more of the conversions, the detection, and the sampling of the row signal, the signal may be converted from an analog signal to a digital signal. For example, the system 100 may include an analog-to-digital converter (ADC) as part of the sampler 125 or as part of each detector 120.

The system 100 further includes a controller 130 configured to control the operation of the system 100 and a data store 132 accessed by the controller during operation of the system. Specifically, the controller 130 is configured to communicate with the voltage drivers 110 to coordinate the sequential testing of the columns of the sensor matrix 105 and is configured to receive the detected numbers representative of the measured capacitances from the sampler 125. The controller 130 may perform a calibration routine based on the numbers received from the sampler 125 to determine baseline values and store the baseline values in the data store 132 for later access for detecting touches, as described in more detail below. This calibration routine may be used to compensate for mechanical variations in sensor construction, variations in electronic component parameters, and other sources of static offset. As described in further detail below, the calibration routine also may be used to reduce the impact of periodic noise.

The controller 130 is further configured to determine the locations of touches on the sensor matrix 105 by comparing the numbers received from the sampler 125 to corresponding baseline capacitance numbers stored for each row and column intersection of the matrix 105. For example, if a number is received for row "b" when column "a" is being tested, that number may be compared by the controller 130 to a baseline number previously stored for the (a, b) location on the matrix 105. As noted above, if the number deviates from the baseline number by a predetermined amount, the controller 130 may conclude that a touch exists at or near the (a, b) location on the matrix 105. Through sequential testing of each column of the sensor matrix 105, corresponding detection of row currents, conversion of the detected row currents to numbers and comparing the numbers to baseline numbers, the system 100, under the control of the controller 130, is able to generate a bitmap image of the sensor matrix 105 where the location of each touch point on the sensor matrix 105 is identified.

A periodic noise source 135, however, can negatively impact the performance of the system 100 by coupling to the sensor matrix 105 and, thereby, producing noise currents in the rows. The noise currents may result in false touch events, the disregarding of real touch events, and/or an incorrect touch location when location interpolation is used.

Notably, noise currents may result from many different types of noise sources. For example, large currents at 50 Hz or 60 Hz may flow due to voltage gradients set up by the power mains of the system 100. These large currents, however, are well-separated in frequency from the typical excitation frequencies of the voltage drivers 110 (which may be typically on the order of 100 kHz) and, therefore, may be rejected fairly easily through use of frequency-selective filters. High-frequency currents additionally or alternatively may flow, for example due to radio and television broadcasts. These currents, however, have a frequency that is typically around 1 MHz or higher, and therefore also may be easily rejected through use of frequency-selective filters.

The most significant interference, therefore, may result from noise sources that produce noise signals close in frequency to the excitation frequency of the voltage drivers 110. These noise signals may include noise generated by switch-mode power supplies, which typically operate with switching frequencies on that order; and large-amplitude noise generated by power supplies with a high voltage output (e.g., fluorescent lamp power supplies).

When the sensor matrix 105 is used in close proximity to a liquid crystal display (LCD) or other display device, the display device may be the largest source of noise, particularly when the display device is optically bonded to the sensor matrix 105 using a transparent adhesive, and not spaced apart with an air gap. The optically clear adhesive may be thinner than the thinnest practical air gap, and the noise may increase as the sensor matrix 105 is thus moved closer to the display device. The noise also may increase due to the higher dielectric constant of the adhesive as compared to that of air. That is, the relative dielectric constant of the adhesive may typically be between 3 and 4, whereas the relative dielectric constant of air is very close to that of free space, i.e. 1. Since the noise is coupled capacitively, the amplitude of that noise current is roughly proportional to the dielectric constant of the insulating material through which it couples, and roughly proportional to the reciprocal of the thickness of that material.

The noise coupled from the display device may consist of multiple components. Some of these components may depend upon the image displayed on the display device, but others may not. The noise may have a strong component at the line-scan frequency of the video, which may be around 100 kHz and thus may be very close to the excitation frequency of the system 100. This noise around the line-scan frequency may be the most important component for the reasons noted above. The noise around the line-scan frequency may have an amplitude and frequency that is very close to constant with time, and independent of the image displayed. This line-scan noise may occur, for example, with LCD, plasma and OLED displays.

The detector 120 may have different immunities to noise, depending on its architecture. Ideally, the detector 120 may be a circuit that pointwise multiplies the received signal by the expected signal, and computes the integral of that quantity over the full excitation period. This is equivalent to computing the correlation of the received signal against the expected signal, and is the optimal detector when the noise has certain characteristics (e.g., when the noise may be characterized best as additive white Gaussian noise). In practice, however, the noise typically does not have the characteristics that are optimally rejected with this kind of detector, and, therefore, the detector 120 that performs this correlation operation may not be optimal in practice. However, as described in U.S. patent application Ser. No. 12/838,422, which is incorporated herein by reference for all purposes, the excitation waveform transmitted by the voltage drivers 110 when using detectors 120 that perform this correlation operation may be chosen with characteristics that maximally reject certain types of noise expected in practice. The correlation operation, however, may be complex and therefore expensive to perform exactly. A lower-cost detector is possible, however, by using switched-capacitor or other circuits to approximate the correlation operation.

Figure 2:
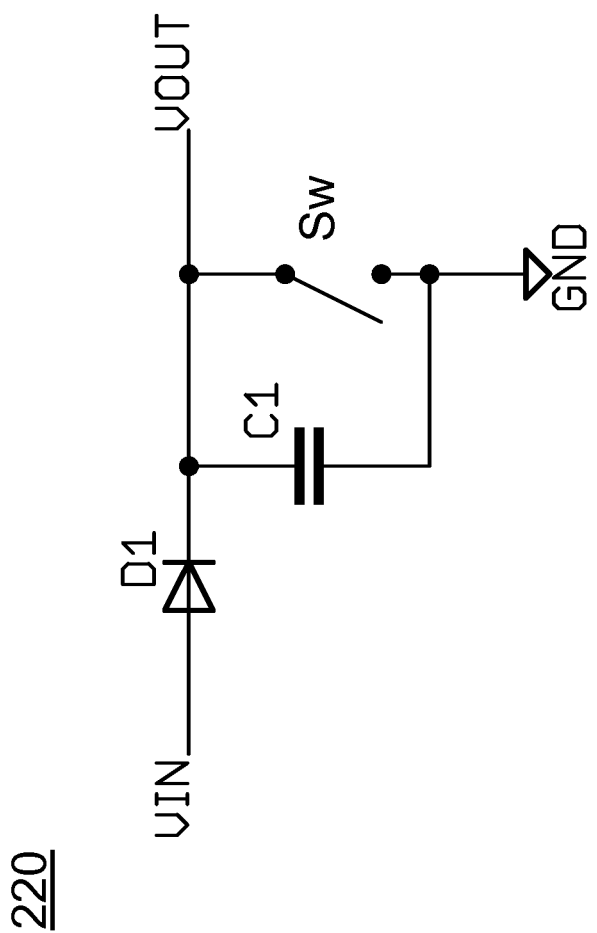
FIG. 2 is a circuit diagram of a peak detector circuit.

If an even lower cost detector is desired, the detector 120 may instead be a broadband detector, such as, for example, a peak detector circuit 220, as shown in FIG. 2. The peak detector circuit 220 is lower in cost and complexity than the detector circuit that performs the above-described correlation operation, but is also less resistant to noise. It may be assumed that the circuit 220 is driven from a low-impedance voltage source, and that its output is connected to a high-impedance circuit. The input of the peak detector circuit 220 may, for example, be a voltage input Vin that is driven by the transimpedance amplifier 115.

The peak detector circuit 220 records the maximum value of its input voltage Vin (minus the voltage drop across the diode D1), and holds that voltage at Vout indefinitely. To reset the circuit, the capacitor C1 may be shorted, for example by briefly connecting Vout to ground using a switch SW. If the need to explicitly reset the circuit is undesirable, then the switch SW may be replaced by a resistor to ground. The measured peak voltage may then decay exponentially over time, with a time constant R*C.

Many modifications to the peak detector circuit 220 may exist. For example, a resistor in series with the diode D1 may cause the capacitor C to charge with some time constant when the diode D1 conducts, and not instantaneously. This may reduce the circuit's response to fast transient noise. The peak detector circuit 220 may likewise be followed by other signal processing circuitry, for example a low-pass filter, which may have the effect of averaging the measured peak voltage over multiple cycles of the input signal, reducing noise.

To a first order, the peak detector circuit 220 may have no frequency selectivity, i.e., it may provide the same output voltage Vout for a sinusoidal input voltage Vin of given amplitude, regardless of that sinusoid's frequency. Certain effects, for example, the RC decay when the peak detector is not reset explicitly, or the non-idealities of the components, may cause some frequency selectivity, but, generally, the frequency response of the peak detector circuit 220 may be quite broad, covering at least one or two octaves. The peak detector circuit 220, therefore, may provide no clear means to reject noise based on frequency, unless the frequency is very well-separated from that of the Vin excitation signal. The peak detector circuit 220 may be made frequency-selective by adding filters ahead of it, but this may significantly increase the complexity and cost of the circuit, and, with typical analog filter techniques, may still be fairly broadband.

Figure 3:
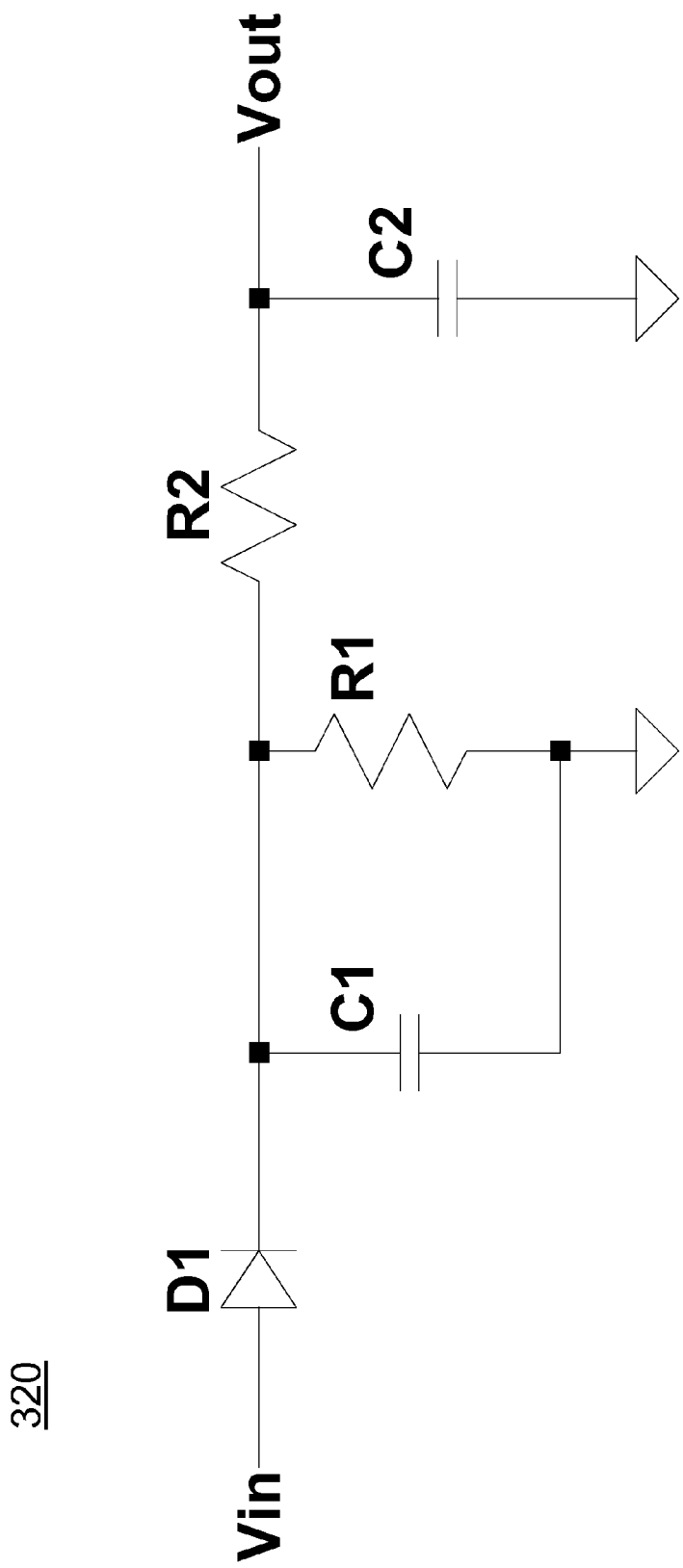
FIG. 3 is a circuit diagram of a peak detector circuit.

FIG. 3 shows an example of a peak detector circuit 320 that is identical to the peak detector circuit 220 with the exception that the switch SW is replaced by a first resistor R1 and that the circuit further includes a first order low-pass filter formed by a second resistor R2 and a second capacitor C2. As described in detail below with reference to FIGS. 4-6 and 8, the peak detector circuit 320 may be made more resistant to noise by locking the phase of the excitation signal Vin with the phase of the noise generated by the periodic noise source 135. By locking the phase of the excitation signal Vin in this manner, the noise from the periodic noise source 135 may be turned into a simple voltage offset and may, thereby, be removed by simply compensating for that voltage offset during the calibration step noted previously.

While FIGS. 4-6 and 8 illustrate how this technique works with a system 100 that employs the peak detector circuit 320, the technique also may be employed more generally with a system 100 that employs any type of detector 120, provided that the detector 120 is deterministic and keeps no state across sensor frames. That is, the technique may be employed more generally with a system 100 that employs any type of detector 120 that produces the same output for the same input and, accordingly, may be used not only with a peak detector, but also with another broadband detector (e.g., an "energy detector" that integrates the square or absolute value of the signal over the measurement period, whether these operations occur in analog or digital circuitry), or with a narrowband detector (for example, the correlation-based detector described earlier).

Figure 4:
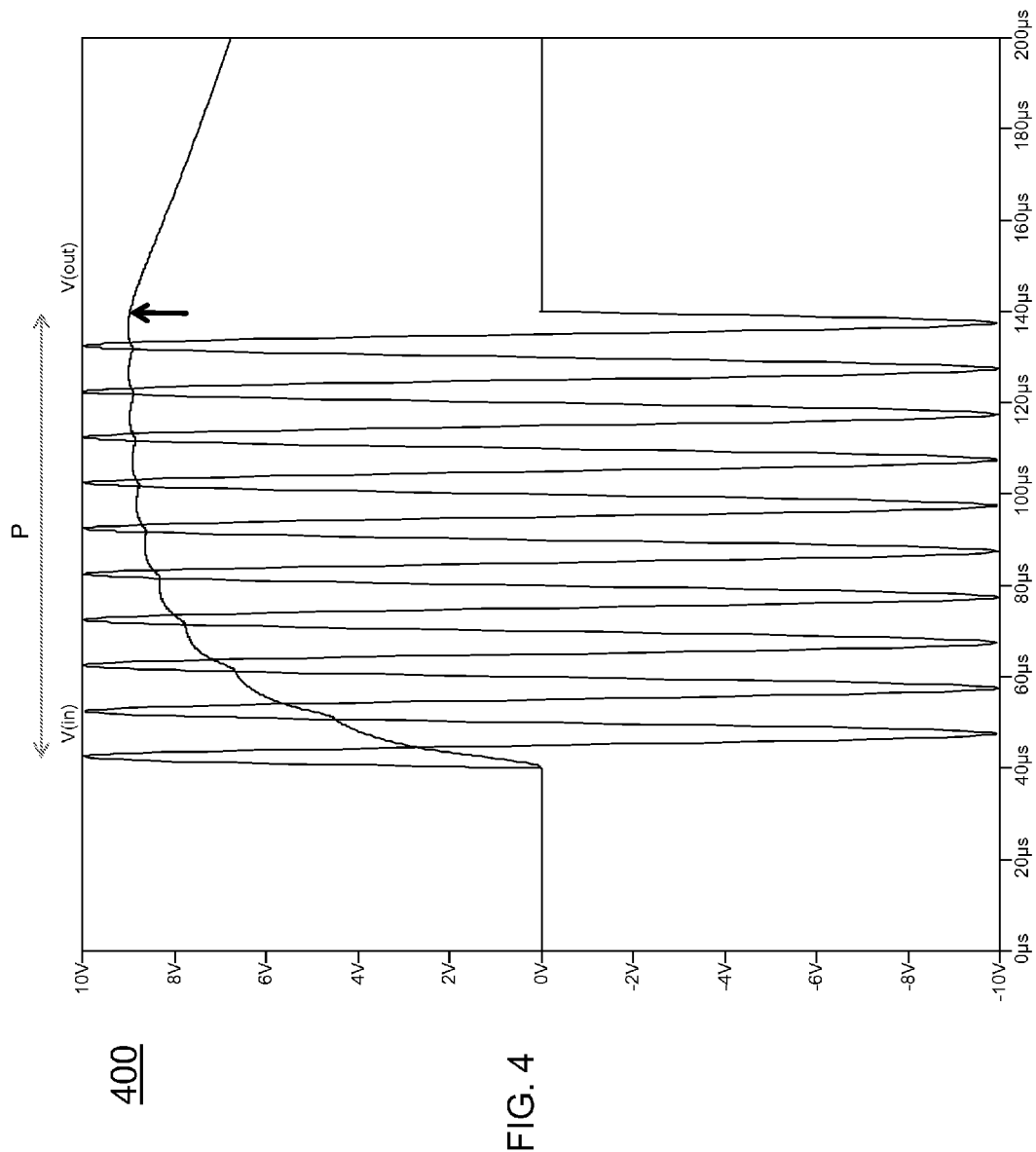
FIG. 4 is a graph depicting an input voltage and a corresponding output voltage of a peak detector circuit in the absence of noise.

FIG. 4 shows a graph 400 depicting the input voltage Vin and the corresponding output voltage Vout for the peak detector circuit 320 when no noise is present and the input voltage Vin is a burst of 10 cycles at 100 kHz having a constant 10 V amplitude. As noted previously, the input voltage Vin may be a voltage that is outputted by the transimpedance amplifier 115 and that is proportional to the instantaneous value of the row current received by the transimpedance amplifier 115 from the sensor matrix 105. Notably, while FIG. 4 (and FIGS. 5-7) depict an input voltage Vin that is a sinusoidal waveform, another waveform (e.g., a square wave) with the same period may be used in practice.

As shown in the graph 400, in the absence of noise, the peak detector circuit 320 may output a voltage Vout that is proportional to the input voltage Vin and, therefore, is proportional to the amplitude of the received row current. The peak detector circuit 320 that exhibits the behavior depicted in the graph 400 is configured with a resistor to ground, rather than a switch SW, and is, therefore, not explicitly reset. Moreover, the peak detector circuit 320 includes a first-order low-pass filter. This low-pass characteristic causes the slow exponential increase in Vout in response to a stepped change in the amplitude of the input.

In a typical application, the output of the peak detector circuit 320 may be sampled once by the sampler 125, at an instant in time close to the end of the measurement period P (i.e., close to the end of the time period during which the time-varying excitation voltage is applied by the voltage driver 110). The one sample may be converted into a digital number through use of an ADC and may then be stored by the controller 130 in a manner that designates the digital number as a measured capacitance value for the corresponding (row, column) position in the bitmap of measured capacitances. In the example shown in FIG. 4, the instant at which the voltage output Vout is sampled is denoted by a thick arrow. In a single sensor frame, this measurement is typically made for every row-column intersection in the sensor matrix 105. Thus, for a given row-column intersection in the sensor matrix 105, this measurement is repeated every sensor frame.

As shown in FIG. 4, some ripple may be present in the output voltage Vout. Because of this ripple, if the output voltage Vout were sampled with random phase with respect to the time-varying excitation signal Vin, then a time-varying error (i.e., noise) may be introduced from one sensor frame to the next. Stated differently, as shown in the graph 400, the value of Vout varies during the measurement period P during which the time-varying excitation signal Vin is applied. Accordingly, if the sampler 125 takes a sample at a random point in time during the measurement period P for each sensor frame, then the value of the sample of Vout will also vary randomly from sensor frame to sensor frame, thereby introducing a random noise. However, since the same system 100 is both generating the column excitation signal and measuring the resulting row current, the system 100 may maintain the phase relationship between the sampling of the output voltage Vout and the time-varying excitation signal Vin constant. In this way, the system 100 is able to ensure that the sampler 125 samples the output voltage Vout at the same instant in time relative to the time-varying excitation signal Vin from sensor frame to sensor frame. The error introduced by the ripple present in the output voltage Vout may, therefore, become constant with time, and thus may be subtracted out or otherwise incorporated into a baseline value determined during a calibration step. As stated previously, such a calibration step may already be necessary, to compensate for mechanical variation in the sensor construction, variation in electronic component parameters, and other sources of static offset. The system 100 may store in the data store 132 a separate baseline capacitance (or other baseline value that indicates a capacitance) for each row-column intersection in the sensor matrix 105.

Figure 5:
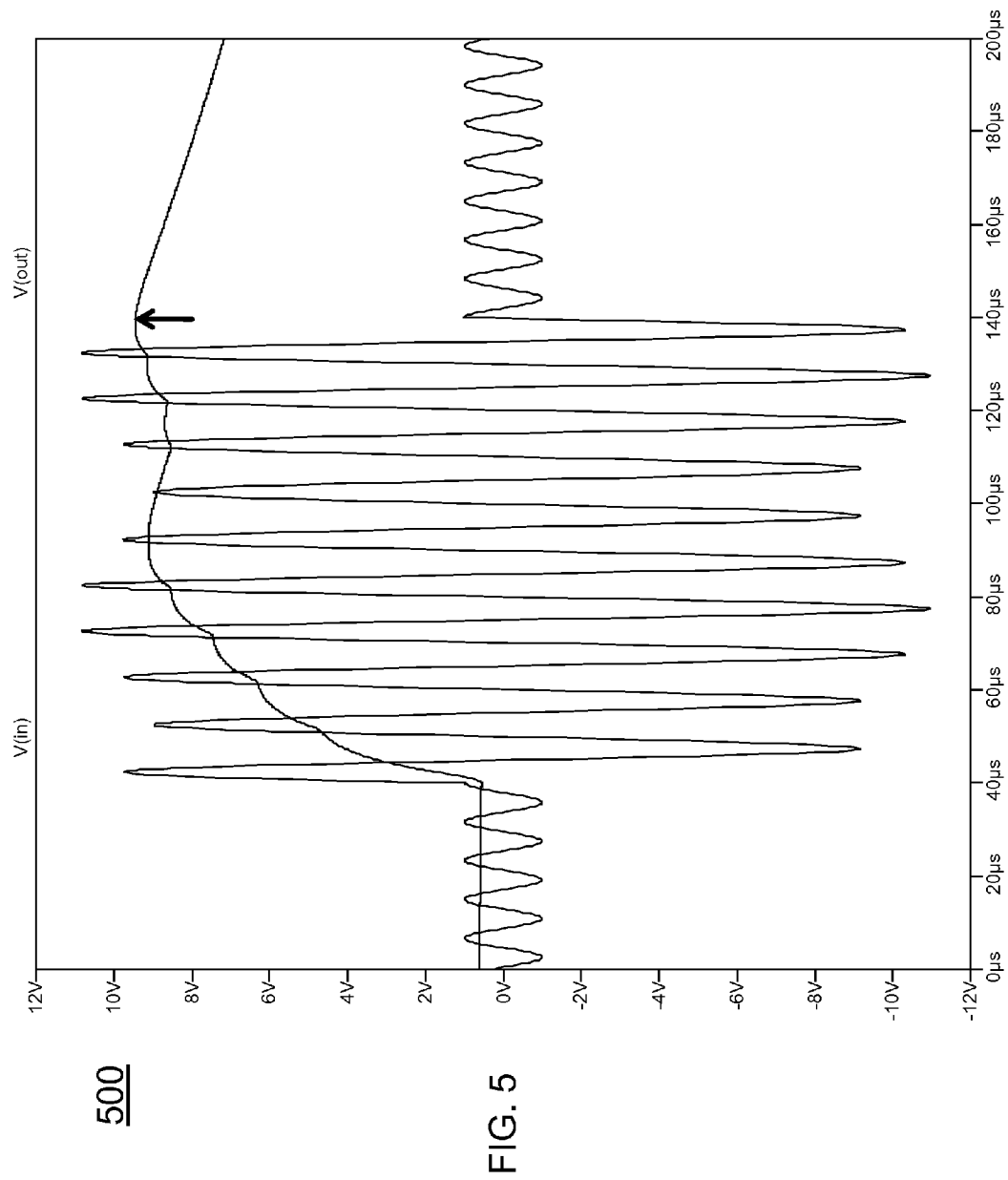
FIG. 5 is a graph depicting an input voltage and a corresponding output voltage of a peak detector circuit when a constant amplitude narrowband noise is present.

FIG. 5 shows a graph 500 depicting the input voltage Vin and the corresponding output voltage Vout for the peak detector circuit 320 when constant amplitude narrowband noise of 1 V at 120 kHz is present and when the input voltage Vin is otherwise the same as that shown in FIG. 4. As shown in the graph 500, in the presence of constant-amplitude narrowband noise, the output voltage Vout of the peak detector 320 may be observed to vary with time, as the phase of the noise and the excitation signal drift with respect to each other, and the signals interfere constructively and destructively.

The output voltage Vout may vary at the beat frequency between the two signals (i.e., between the excitation signal and the narrowband noise signal). This variation may be undesirable, but may not necessarily be a problem provided that the peak detector circuit 320 always samples the output voltage Vout at the same instant, with that timing taken with respect to the excitation signal. As described above with respect to FIG. 4, configuring the sampler 125 to take a sample at the same instant in time relative to the time-varying excitation signal Vin allows ripples in the output voltage Vout to be removed as a fixed offset incorporated into a baseline value during calibration when the excitation signal Vin remains constant from one sensor frame to the next. If, however, the excitation signal Vin varies from one sensor frame to the next due to the existence of noise, the offset will also vary with time, resulting again in an undesirable noise, despite the sampling occurring at the same instant in time relative to the time-varying excitation signal Vin in each sensor frame.

To illustrate, assume that the peak detector circuit 320 generates the output voltage Vout shown in graph 500 of FIG. 5 for one particular row-column intersection of the sensor matrix 105 during one sensor frame. The sampler 125 captures a sample at the end of the measurement period p corresponding to about 9 volts, as shown by the arrow in the graph 500. Because the excitation voltages applied by the voltage drivers 110 of the system 100 are entirely decoupled from the narrowband noise signal depicted in FIG. 5, the phase difference between the excitation voltage and the noise signal may vary randomly from one sensor frame to the next. For example, as shown in a graph 600 depicted in FIG. 6, the subsequent sensor frame may exhibit a new phase difference, in this graph a 180 degree phase difference, between the excitation voltage and the noise signal. The new phase difference may result in the sampler 125 capturing a sample at the end of the measurement period p corresponding to a new value of about 8 volts, as shown in the graph 600, despite that sample being taken at the same instant in time relative to the time-varying excitation voltage Vin as shown in the graph 500. Accordingly, the voltage at the sampling time may be different in the two cases, due to the difference in the phase of the noise with respect to the excitation signal. This may result in noise on the measured capacitance.

In general, the phase of the noise will be random, since it depends upon different frequency or time references (e.g., crystals or RC oscillators) from those of the controller 130. The measured signal will therefore be observed to vary with time, introducing noise in the measured current amplitude and therefore capacitance.

To avoid this, the excitation waveform produced by the voltage drivers 110 may be phase-locked to the expected noise source or sources. For example, when the periodic noise source 135 is a display device (e.g., an LCD) having a horizontal synchronization (i.e., HSYNC or line sync) output, this output may be connected to the controller 130 to allow the controller 130 to instruct the voltage drivers 110 to apply excitation voltages in a manner that maintains constant in time the difference between the phases of the applied excitation voltages and the phase of the horizontal synchronization output of the display device. By keeping the phase difference between the applied excitation voltages and the noise signal constant in time, the effect of the noise is the same every time a measurement is made. The effect of the noise, therefore, becomes a constant offset, and a calibration routine, which may already be present to remove other constant offsets, may remove the effect of the noise.

A calibration routine may measure the capacitance from each row to each column with no fingers or other objects touching or close to the display. Since these measurements may be affected by noise in the same way as the capacitance measurements made during normal operation (i.e., made in order to determine the presence and location of finger or other touches), the system may measure these capacitances with no fingers touching over multiple frames, and average these multiple frames to reduce the effects of time-varying noise. Baseline values (e.g., for each row-column intersection) may then be determined from these measured capacitances and stored in the data store 132 for later access by the controller 130. Notably, by virtue of the fact that the excitation waveform was phase locked to the expected periodic noise source or sources, the effect of the periodic noise source or sources will be reduced to a constant offset in the determined baseline values.

In some implementations when multiple sensors of comparable design are manufactured, the calibration routine may occur only once, with the same baseline values used for all sensors of that design. In other implementations, the calibration routine may be repeated once for each individual sensor. By repeating the calibration routine once for each individual sensor, it may be possible to compensate for static manufacturing variation in each sensor (e.g., in-plane displacement between the rows and columns due to misalignment in a lamination process).

In some implementations, the calibration routine occurs only once during the lifetime of the sensor. That is, a single calibration routine is implemented to determine the baseline values for the sensor (typically when the sensor is first manufactured), and the determined baseline values are then stored for later access by the sensor during normal operation throughout the life of the sensor.

In other implementations, the calibration routine may be repeated from time to time during normal operation of the sensor, and the stored baseline values may then be periodically updated based on the measurements made during subsequent calibration routines. By periodically repeating the calibration routine during normal operation of the sensor, it may be possible to compensate for both static manufacturing variation and for time-varying effects (e.g., measurement error due to the temperature coefficient and aging of electronic components).

Notably, if the calibration routine is repeated from time to time during normal operation of a sensor, it may be difficult to ensure that no touches are present while the calibration measurements are made. Heuristic methods, however, may be used to determine whether a user is touching the touch sensor (e.g., by looking for changes in the measured capacitance larger than those expected due to the noise), and the baseline capacitance measurements may then only be made when the system concludes that a user is not touching the sensor. Additionally or alternatively, the baseline capacitance measurements may be made with no regard for whether a user is touching the sensor, and the measured baseline capacitances may be subsequently corrected for the effect of any touches that may be present. For example, the system may look for points (e.g., row-column intersections) in the matrix having a measured capacitance greater than a baseline capacitance for a long period of time. In a system where a touch will cause a decrease in capacitance, such a point is likely to correspond to an incorrect baseline, since no real effect observed in typical operation will correspond to such an increase in capacitance. After detecting an incorrect baseline for one or more points in the matrix in this manner, the system may then, for example, selectively repeat the calibration measurements for those points in the matrix corresponding to the detected incorrect baseline values to determine new baseline values.

Figure 6:
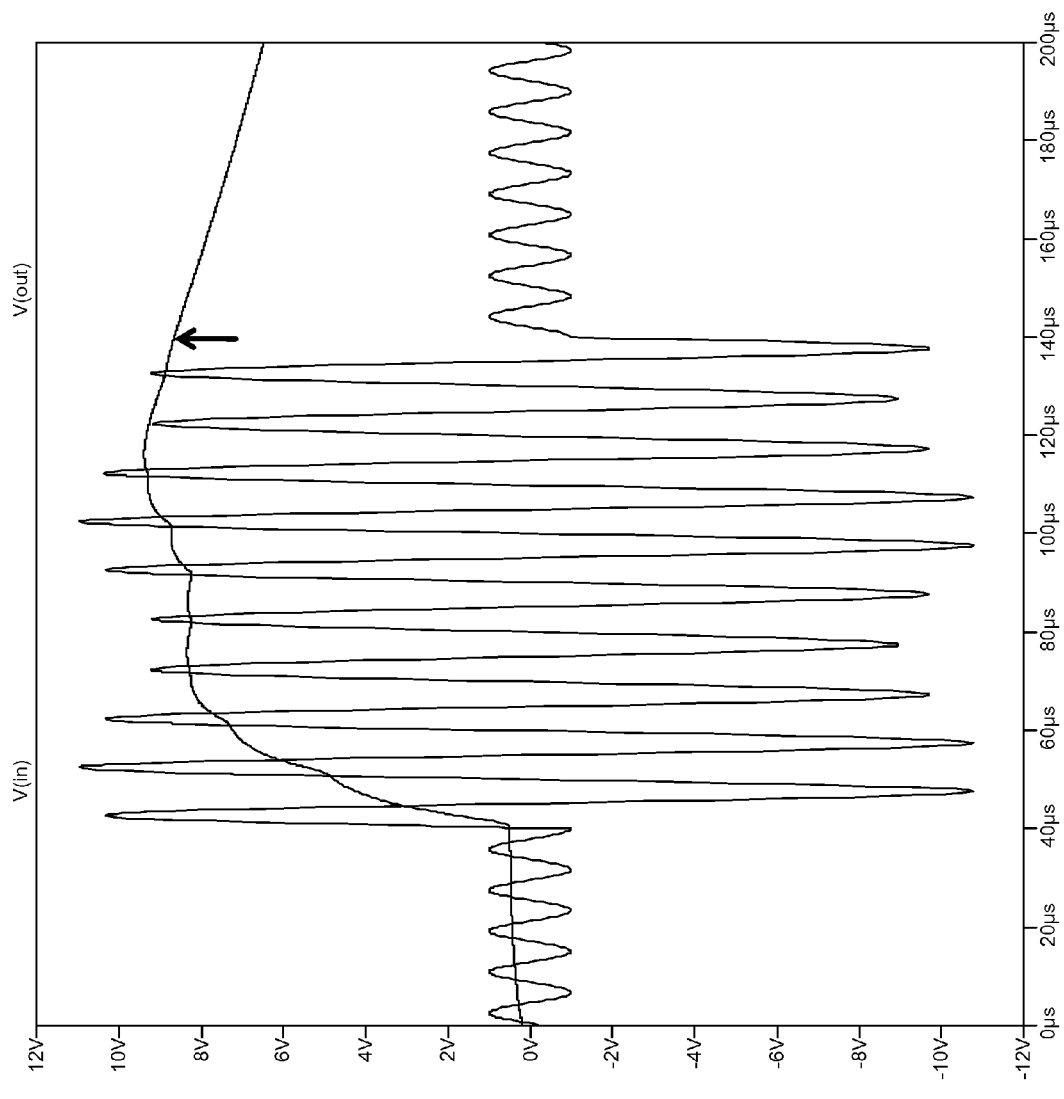
FIG. 6 is a graph depicting an input voltage and a corresponding output voltage of a peak detector circuit when a constant amplitude narrowband noise is present.
Figure 7:
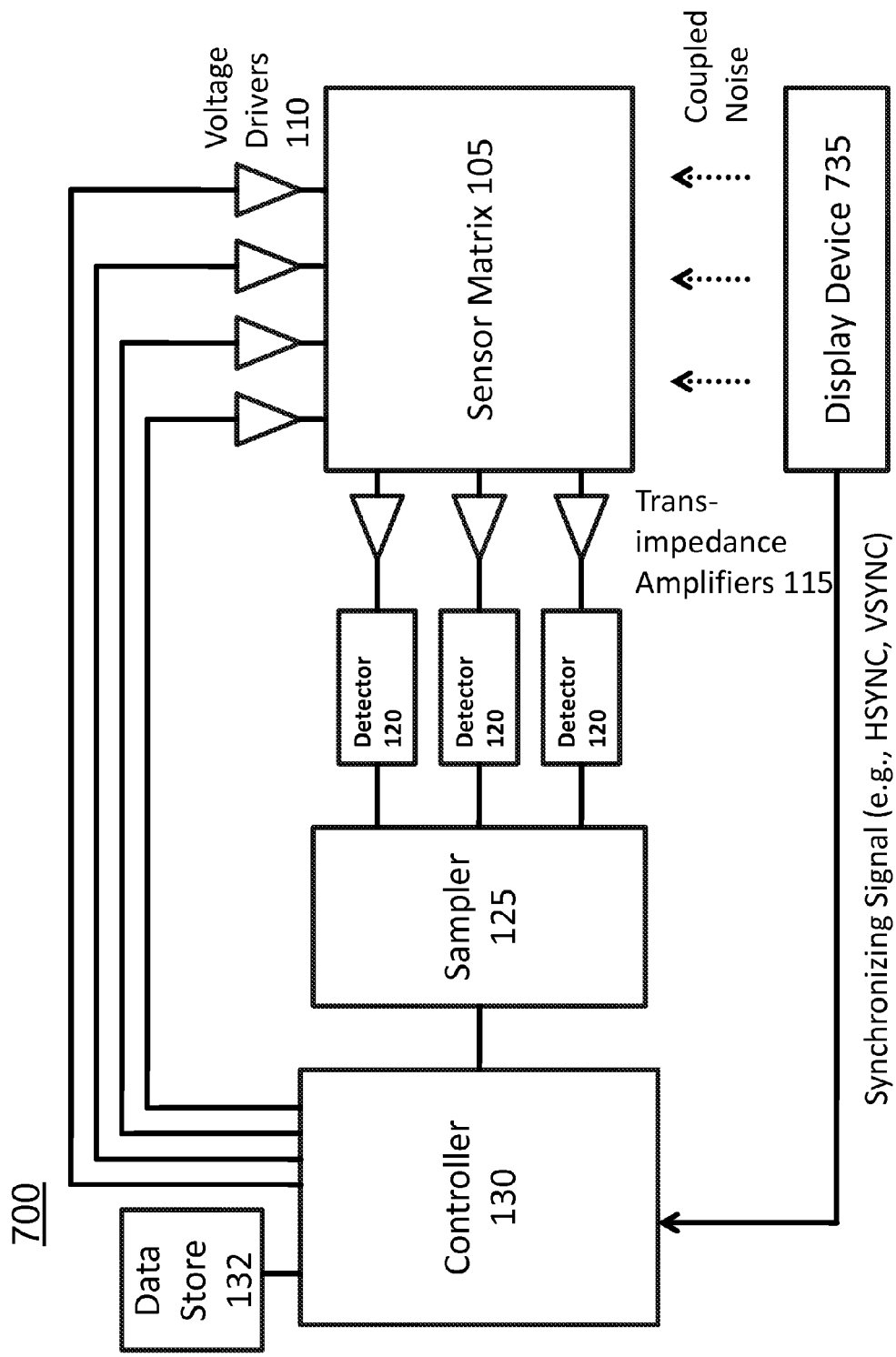
FIG. 7 is a diagram of a touch sensor system having improved noise reduction capabilities where a source of the noise is a display device.

FIG. 7 is a diagram of an implementation 700 of the touch sensor system 100 where the periodic noise source is a display device 735. The display device may be, for example, an LCD or an OLED or plasma display. In FIG. 6, the capacitive sensor controller 130 is shown receiving an explicit synchronization signal from the display device 735. If such a signal is available, then this may be preferable; but if not, then the controller 130 may instead measure the phase of the incoming noise using the detectors 120, and instruct the voltage drivers 110 to apply excitation voltages having a phase that is fixed relative to the detected phase of the incoming noise.

The choice of the phase of the excitation voltages with respect to the phase of the noise may generally be arbitrary, as long as the corresponding phase difference remains substantially constant in time. With certain types of noise, however, some phases may be preferable to others. For example, if the noise is periodic but impulsive in nature, then it may be preferable to deliberately choose the excitation frequency close to the noise frequency, and align the phases such that the impulses do not occur close to the peaks of the desired excitation signal. The output of the peak detector may then become almost completely insensitive to the noise, even if its amplitude varies with time.

Figure 8:
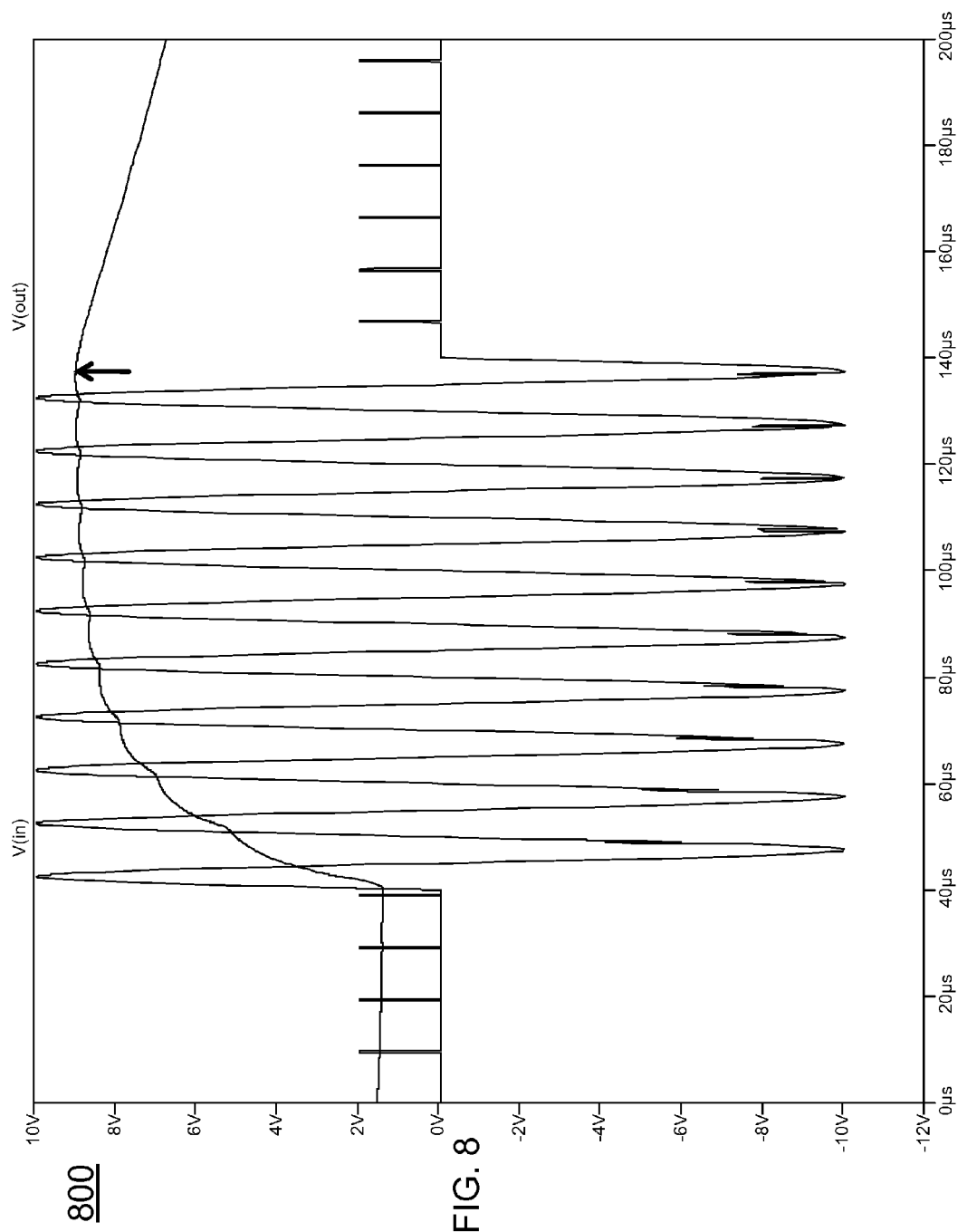
FIG. 8 is a graph depicting an input voltage and a corresponding output voltage of a peak detector circuit when noise that is periodic and impulsive is present.

FIG. 8 shows a graph 800 depicting the input voltage Vin and the corresponding output voltage Vout for the peak detector circuit 320 when the noise is periodic and impulsive in nature and the frequency and the phase differences of the excitation voltage are chosen to minimize the impact of the noise. As shown in the graph 800, the noise is observed to affect the resulting signal Vin only close to the negative extrema of the signal Vin, and the peak detector circuit 320 responds to the positive extrema. The measurement, therefore, may be insensitive to that noise.

Accordingly, when the excitation signal is phase-locked to the noise, even noise that is directly in-band (i.e., extremely close in frequency) may provide only a constant offset, which may be calibrated in the usual manner. Any noise source with periodicity such that it occurs identically during each sensor frame may be rejected by these techniques, regardless of the other characteristics of that noise.

Since the phase of the excitation signal with respect to the noise may be arbitrary, provided that the phase difference between the excitation signal and the noise signal remains constant in time, the phase relationship need not be re-established for every measurement. For example, if the noise is exactly periodic over a single frame of an LCD, then it's sufficient to always start the touch sensor's sequence of measurements at the same phase with respect to the LCD's frame, using the LCD's vertical synchronization (VSYNC, frame sync) signal. Different measurements made during the touch sensor's frame may occur at different phases with respect, for example, to the line sync noise, but the noise may still be rejected, as long as that phase difference between the line sync noise and the excitation signal is the same during each sensor frame.

In such a case, the touch sensor may operate at a frame rate equal to the LCD's frame rate, or at some integer submultiple thereof. If it is necessary to operate the touch sensor at a frame rate higher than that of the LCD, then multiple baseline values (for the purpose of subtracting that constant offset) may be maintained.

Figure 9:
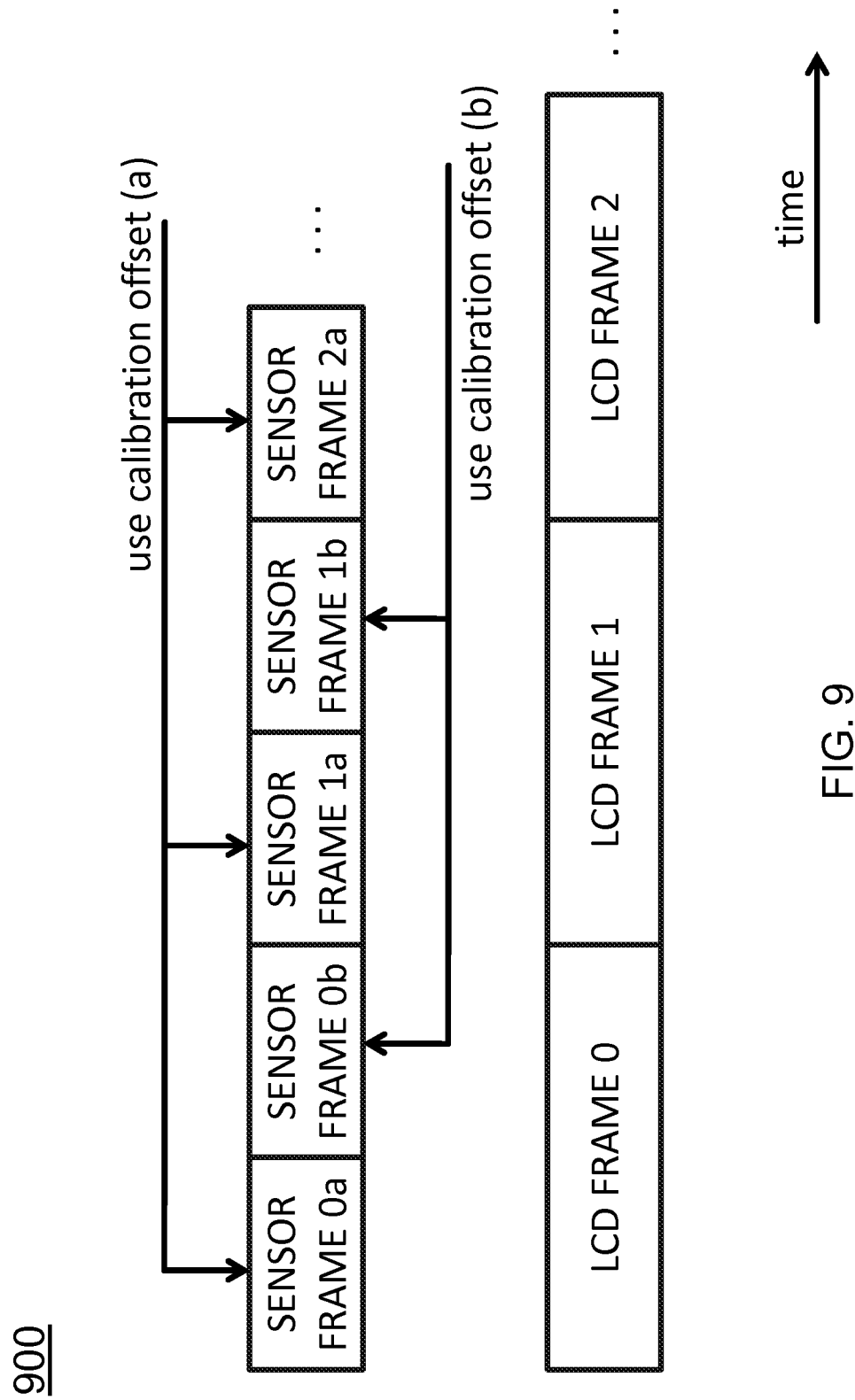
FIG. 9 is a diagram depicting a sensor frame rate relative to a liquid crystal display (LCD) frame rate.

FIG. 9 shows a diagram 900 depicting a sensor frame rate that is equal to two times the LCD (or, more generally, the display device) frame rate. For example, the LCD may operate at 60 Hz, and the touch sensor may operate at 120 Hz. Half of the touch sensor frames (i.e., frames 0a, 1a, 2a, etc.) then begin at the same time as the LCD frames (i.e., LCD frames 0, 1, 2, etc.). These sensor frames are thus phase-locked to the LCD, such that the noise will cause only a constant offset. The other half of the sensor frames (i.e., frames 0b, 1b, 2b, etc.) may begin halfway through the LCD frames, filling in the empty spaces. These sensor frames are again phase-locked, and the noise will again appear only as a constant offset. The constant offset used for the first set of sensor frames (i.e., frames 0a, 1a, 2a, etc.), however, may be different from the constant offset used for the second set of sensor frames (i.e., frames 0b, 1b, 2b, etc.), and, therefore, the system 100 maintains two separate baselines, one for each set of sensor frames (i.e., one baseline that incorporates offset (a) and one baseline that incorporates offset (b), respectively), to ensure that the correct constant offset is subtracted for each sensor frame. This technique may be extended to a sensor frame rate equal to any integer multiple of the LCD frame rate by maintaining a number of different constant offsets (and, thus, a corresponding number of different baselines) equal to the integer multiple. By observing that a signal that's periodic over an interval is also periodic over any integer multiple of that interval, this technique may be extended to any rational multiple of the LCD frame rate.

Specifically, if the sensor frame rate of a system is set to a rational multiple of the LCD frame rate, then the ratio of the sensor frame rate to the LCD frame rate can be represented by x:y, where x and y are integers. Assuming that x and y have no common integer divisors, then the number of baselines stored by the system will be equal to the integer x. That is, the number of baseline values stored by the system for a given point in the matrix will be equal to the integer x. For example, if the ratio of the sensor frame rate to LCD frame rate (or, more generally, display device frame rate) is 1:4, then only one baseline value is stored by the touch sensor for a given point in the matrix and is used to determine touches at that point during each sensor frame. In contrast, if the ratio of the sensor frame rate to LCD frame rate is 3:7, three baselines are stored by the touch sensor for a given point in the matrix and are then used during multiple different (e.g., sequential) sensor frames to determine touches at that point during the respective sensor frames.

Notably, the number of baselines stored by the system may be equal to the integer x, even if x and y have common integer divisors. However, such a system is generally not optimal because some of the baselines will be duplicates. For example, if the ratio of the sensor frame rate to LCD frame rate is 2:8, two baseline values may be stored by the touch sensor for a given point in the matrix, and the touch sensor is able to operate correctly using the two baseline values. However, the two baseline values will be duplicates of each other, and, as such, their separate storage and access in a practical system may be unnecessary.

In some implementations, baseline values are determined and stored as described above for each point in the matrix of the touch sensor. In other implementations, baseline values are determined and stored as described above for a subset of the points in the matrix, rather than for each point in the matrix.

Some of the described implementations of the subject matter and the operations can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. A human finger, for example, can interact with a touch screen to impact an amount of screen real estate. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful.

What is claimed is:

1. A method for providing a cleaned signal in a capacitive touch sensor, the capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix, the method comprising:
   determining a phase of periodic noise on an input of the capacitive touch sensor;
   generating a periodic excitation signal having a phase that is locked to the determined phase of the periodic noise;
   applying the periodic excitation signal to an excited conductor in the first array;
   while the excitation signal is applied, detecting a response signal on a responding conductor in the second array, and generating, based on the detected response signal, a value indicative of a measured capacitance between the excited conductor and the responding conductor;
   accessing a threshold value;
   determining whether the response signal corresponds to a touch based on a difference between the value and the threshold value; and
   producing a signal reflecting results of the determination of whether the response signal corresponds to a touch.

2. The method of claim 1, wherein determining whether the response signal corresponds to a touch comprises determining whether the response signal corresponds to an input mechanism being in such physical proximity to the matrix that the input mechanism, by virtue of its proximity to the matrix, imparts a capacitance change between the excited conductor and the responding conductor.

3. The method of claim 2, wherein determining whether the response signal corresponds to a touch comprises determining whether the response signal corresponds to an input mechanism being in direct physical contact with the matrix such that a capacitance change occurs between the excited conductor and the responding conductor.

4. The method of claim 1, wherein generating a periodic excitation signal having a phase locked to the determined phase of the periodic noise comprises generating a periodic excitation signal such that a phase difference between the generated periodic excitation signal and the periodic noise is kept constant in time.

5. The method of claim 1, wherein the threshold value is determined during calibration of the capacitive touch sensor and includes a constant offset that reflects the effect of the periodic noise on the response signal.

6. The method of claim 5, further comprising calibrating the touch sensor to determine the threshold value.

7. The method of claim 1, wherein detecting a response signal on a responding conductor in the second array comprises detecting the response signal using a detector that is deterministic and maintains no state across sensor frames.

8. The method of claim 7, wherein generating, based on the detected response signal, a value indicative of a measured capacitance between the excited conductor and the responding conductor comprises:
the detector generating a detector signal based on the response signal, and
sampling the detector signal to arrive at the value indicative of a measured capacitance between the excited conductor and the responding conductor.

9. The method of claim 8, further comprising using a frequency selective filter to filter out noise from the response signal and then providing the filtered response signal to the detector for generating the detector signal.

10. The method of claim 9, wherein using the frequency selective filter to filter out noise comprises using the frequency selective filter to filter out noise having a frequency lower than a frequency of the periodic excitation signal.

11. The method of claim 9, wherein using the frequency selective filter to filter out noise comprises using the frequency selective filter to filter out noise having a frequency higher than a frequency of the periodic excitation signal.

12. The method of claim 8,
wherein the detector comprises a peak detector circuit that detects a peak of the response signal, and
wherein generating the detector signal comprises the peak detector circuit generating a signal reflecting the peak of the response signal.

13. The method of claim 8,
wherein the detector comprises a correlation detector circuit that computes a correlation between the response signal and an expected response signal, and
wherein generating the detector signal comprises the correlation detector circuit generating a signal reflecting the correlation between the response signal and the expected response signal.

14. The method of claim 8,
wherein the excitation signal is a voltage and the response signal is a current,
wherein the detector further includes an amplifier that converts the current response signal to a current, a voltage, a digital code or another quantity, and
wherein generating the detector signal based on the response signal comprises:
converting, by the amplifier, the current response signal to a current, a voltage, a digital code or other quantity, and
generating the detector signal by the detector detecting the current, the voltage, the digital code or the other quantity over time.

15. The method of claim 14, wherein the amplifier is a transimpedance amplifier configured to convert the current response signal to a voltage that is then detected over time by the detector.

16. The method of claim 8,
wherein sampling the detector signal to arrive at the value indicative of a measured capacitance between the excited conductor and the responding conductor comprises sampling the detector signal during a measurement period of a sensor frame,
wherein a sample of the detector signal is taken at a same point in time during each measurement period of multiple sensor frames, and
wherein the measurement period of each of the multiple sensor frames is in phase with the periodic excitation signal such that the sample of the detector signal is taken at a same phase of the periodic excitation signal during each sensor frame.

17. The method of claim 1,
wherein the touch sensor is positioned relative to a display device and noise coupled from that display device is periodic over the line-scan frequency or frame frequency of the display device, and
wherein:
determining the phase of the periodic noise comprises:
receiving a synchronization signal from the display device, and
determining the phase of the periodic noise based on the synchronization signal, and
generating the periodic excitation signal comprises using the synchronization signal to lock the phase of the generated periodic excitation signal to the phase of the periodic noise.

18. The method of claim 17, wherein the synchronization signal is a line synchronization signal or a frame synchronization signal of the display device.

19. The method of claim 17, wherein the display device comprises a liquid crystal display device, an OLED display device, or a plasma display device.

20. The method of claim 1,
further comprising:
determining the threshold value during a calibration routine of the sensor, and
storing the threshold value in a data store, and
wherein accessing the threshold value comprises accessing the threshold value from the data store.

21. The method of claim 20, wherein the calibration routine during which the threshold value is determined is performed when the sensor is manufactured.

22. The method of claim 20, wherein the calibration routine during which the threshold value is determined is only performed once during the lifetime of the sensor.

23. A method for providing cleaned signals in a capacitive touch screen display having a capacitive touch sensor positioned relative to a display device, the capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix, the method comprising:
receiving a synchronization signal from the display device;
configuring the touch sensor to have a sensor frame rate equal to a rational multiple of a frame rate of the display device;
determining a phase of periodic noise generated by the display device based on the synchronization signal;
during a first sensor frame of the touch sensor, generating a first periodic excitation signal having a phase that is locked to the determined phase of the periodic noise, and applying the first periodic excitation signal to an excited conductor in the first array;
while the first excitation signal is applied during the first sensor frame, detecting a first response signal on a responding conductor in the second array, the responding conductor being capacitively coupled to the excited conductor, and generating, based on the detected first response signal, a first value indicative of a measured capacitance between the excited conductor and the responding conductor;

accessing a first threshold value;

determining whether the first response signal corresponds to a touch based on a difference between the first value and the first threshold value; and producing a signal reflecting results of the determination of whether the first response signal corresponds to a touch.

24. The method of claim 23, wherein the synchronization signal is a line synchronization signal or a frame synchronization signal of the display device.

25. The method of claim 23, wherein the display device comprises a liquid crystal display device, an OLED display device, or a plasma display device.

26. The method of claim 23, wherein generating, based on the detected first response signal, a first value indicative of a measured capacitance between the excited conductor and the responding conductor comprises:

generating a first detector signal based on the first response signal; and sampling the first detector signal to arrive at a first value indicative of a measured capacitance between the excited conductor and the responding conductor.

27. The method of claim 23, further comprising:

determining the first threshold value during a calibration routine of the sensor, and storing the first threshold value in a data store, and wherein accessing the first threshold value comprises accessing the first threshold value from the data store.

28. The method of claim 27, wherein the calibration routine during which the first threshold value is determined is performed when the sensor is manufactured.

29. The method of claim 27, wherein the calibration routine during which the first threshold value is determined is only performed once during the lifetime of the sensor.

30. The method of claim 23, wherein configuring the touch sensor to have a sensor frame rate equal to a rational multiple of the frame rate of the display device comprises configuring the touch sensor to have a ratio of the sensor frame rate to the frame rate of the display device that is equal to x:y, where x and y are integers and x is greater than one, and further comprising:

during a second sensor frame of the touch sensor that occurs after the first sensor frame, generating a second periodic excitation signal having a phase that is locked to the determined phase of the periodic noise, and applying the second periodic excitation signal to the excited conductor;

while the second excitation signal is applied during the second sensor frame, detecting a second response signal on the responding conductor, and generating, based on the detected second response signal, a second value indicative of a measured capacitance between the excited conductor and the responding conductor;

accessing a second threshold value, the second threshold value being different from the first threshold value;

determining whether the second response signal corresponds to a touch based on a difference between the second value and the second threshold value; and producing a signal reflecting results of the determination of whether the second response signal corresponds to a touch.

31. The method of claim 30, further comprising:

determining the first threshold value and the second threshold value during a calibration routine of the sensor, and storing the first threshold value and the second threshold value in a data store, wherein accessing the first threshold value comprises accessing the first threshold value from the data store, and wherein accessing the second threshold value comprises accessing the second threshold value from the data store.

32. The method of claim 31, wherein the calibration routine during which the first threshold value and the second threshold value are determined is performed when the sensor is manufactured.

33. The method of claim 31, wherein the calibration routine during which the first threshold value and the second threshold value are determined is only performed once during the lifetime of the sensor.

34. The method of claim 30, wherein generating, based on the detected second response signal, a second value indicative of a measured capacitance between the excited conductor and the responding conductor comprises:

generating a second detector signal based on the second response signal; and sampling the second detector signal to arrive at the second value indicative of a measured capacitance between the excited conductor and the responding conductor.

35. A method for providing cleaned signals in a capacitive touch screen display having a capacitive touch sensor positioned relative to a display device, the capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix, the method comprising:

receiving a synchronization signal from the display device;

configuring the touch sensor to have a ratio of a sensor frame rate to a frame rate of the display device that is equal to x:y, where x and y are integers and x is greater than one;

determining a phase of periodic noise generated by the display device based on the synchronization signal;

storing x threshold values in a data store, each of the x threshold values usable for determining touches during a respective one of x sequential sensor frames; and during each nth sensor frame of the x sequential sensor frames, where n is an integer from 1 to x:

generating an nth periodic excitation signal having a phase that is locked to the determined phase of the periodic noise, and applying the nth periodic excitation signal to an excited conductor in the first array;

while the nth excitation signal is applied during the nth sensor frame, detecting an nth response signal on a responding conductor in the second array, the responding conductor being capacitively coupled to the excited conductor, and generating, based on the detected nth response signal, an nth value indicative of a measured capacitance between the excited conductor and the responding conductor;

accessing, from the data store, an nth threshold value;
determining whether the nth response signal corresponds to a touch based on a difference between the nth value and the nth threshold value; and
producing a signal reflecting results of the determination of whether the nth response signal corresponds to a touch.

36. The method of claim 35, wherein at least two of the x threshold values are different from each other.

37. The method of claim 35, wherein each of the x threshold values is different from each other.

38. The method of claim 35, wherein generating, based on the detected nth response signal, an nth value indicative of a measured capacitance between the excited conductor and the responding conductor comprises:
generating an nth detector signal based on the nth response signal; and
sampling the nth detector signal to arrive at an nth value indicative of a measured capacitance between the excited conductor and the responding conductor.

39. The method of claim 35, further comprising determining the x threshold values during a calibration routine of the sensor.

40. The method of claim 39, wherein the calibration routine during which the x threshold values are determined is performed when the sensor is manufactured.

41. The method of claim 39, wherein the calibration routine during which the x threshold values are determined is only performed once during the lifetime of the sensor.

42. A system for providing a cleaned signal in a capacitive touch sensor, the system comprising:
a capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix; and
one or more circuits configured to:
determine a phase of periodic noise on an input of the capacitive touch sensor;
generate a periodic excitation signal having a phase that is locked to the determined phase of the periodic noise;
apply the periodic excitation signal to an excited conductor in the first array;
while the excitation signal is applied, detect a response signal on a responding conductor in the second array, and generate, based on the detected response signal, a value indicative of a measured capacitance between the excited conductor and the responding conductor;
access a threshold value;
determine whether the response signal corresponds to a touch based on a difference between the value and the threshold value; and
produce a signal reflecting results of the determination of whether the response signal corresponds to a touch.

43. The system of claim 42, wherein the one or more circuits being configured to determine whether the response signal corresponds to a touch comprises the one or more circuits being configured to determine whether the response signal corresponds to an input mechanism being in such physical proximity to the matrix that the input mechanism, by virtue of its proximity to the matrix, imparts a capacitance change between the excited conductor and the responding conductor.

44. The system of claim 43, wherein the one or more circuits being configured to determine whether the response signal corresponds to a touch comprises the one or more circuits being configured to determine whether the response signal corresponds to an input mechanism being in direct physical contact with the matrix such that a capacitance change occurs between the excited conductor and the responding conductor.

45. The system of claim 42, wherein the one or more circuits being configured to generate a periodic excitation signal having a phase locked to the determined phase of the periodic noise comprises the one or more circuits being configured to generate a periodic excitation signal such that a phase difference between the generated periodic excitation signal and the periodic noise is kept constant in time.

46. The system of claim 42, wherein the threshold value is determined during calibration of the capacitive touch sensor and includes a constant offset that reflects the effect of the periodic noise on the response signal.

47. The system of claim 46, wherein the one or more circuits include a processor configured to calibrate the touch sensor to determine the threshold value.

48. The system of claim 42, wherein the one or more circuits being configured to detect a response signal on a responding conductor in the second array comprises the one or more circuits including a detector circuit that is configured to detect the response signal and that is deterministic and maintains no state across sensor frames.

49. The system of claim 48, wherein the one or more circuits include a sampler circuit and the one or more circuits being configured to generate, based on the detected response signal, a value indicative of a measured capacitance between the excited conductor and the responding conductor comprises:
the detector circuit being configured to generate a detector signal based on the response signal, and
the sampler circuit being configured to sample the detector signal to arrive at the value indicative of a measured capacitance between the excited conductor and the responding conductor.

50. The system of claim 49, further comprising a frequency selective filter configured to filter out noise from the response signal and then provide the filtered response signal to the detector circuit for generating the detector signal.

51. The system of claim 50, wherein the frequency selective filter is configured to filter out noise having a frequency lower than a frequency of the periodic excitation signal.

52. The system of claim 50, wherein the frequency selective filter is configured to filter out noise having a frequency higher than a frequency of the periodic excitation signal.

53. The system of claim 49,
wherein the detector circuit comprises a peak detector circuit that detects a peak of the response signal, and
wherein the detector circuit being configured to generate the detector signal comprises the peak detector circuit being configured to generate a signal reflecting the peak of the response signal.

54. The system of claim 49,
wherein the detector circuit comprises a correlation detector circuit that computes a correlation between the response signal and an expected response signal, and
wherein the detector circuit being configured to generate the detector signal comprises the correlation detector circuit being configured to generate a signal reflecting the correlation between the response signal and the expected response signal.

55. The system of claim 49,
wherein the excitation signal is a voltage and the response signal is a current,
wherein the detector circuit further includes an amplifier circuit that converts the current response signal to a current, a voltage, a digital code or another quantity, and
wherein the detector circuit being configured to generate the detector signal based on the response signal comprises:
the amplifier circuit being configured to convert the current response signal to a current, a voltage, a digital code or other quantity, and
the detector circuit being configured to generate the detector signal by detecting the current, the voltage, the digital code or the other quantity over time.

56. The system of claim 55, wherein the amplifier circuit is a transimpedance amplifier configured to convert the current response signal to a voltage that is then detected over time by the detector circuit.

57. The system of claim 49,
wherein the sampler circuit being configured to sample the detector signal to arrive at the value indicative of a measured capacitance between the excited conductor and the responding conductor comprises the sampler circuit being configured to sample the detector signal during a measurement period of a sensor frame,
wherein a sample of the detector signal is taken by the sampler circuit at a same point in time during each measurement period of multiple sensor frames, and
wherein the measurement period of each of the multiple sensor frames is in phase with the periodic excitation signal such that the sample of the detector signal is taken by the sampler circuit at a same phase of the periodic excitation signal during each sensor frame.

58. The system of claim 42, further including a display device,
wherein the touch sensor is positioned relative to the display device and noise coupled from that display device is periodic over the line-scan frequency or frame frequency of the display device, and
wherein the one or more circuits being configured to determine the phase of the periodic noise comprises the one or more circuits being configured to:
receive a synchronization signal from the display device, and
determine the phase of the periodic noise based on the synchronization signal, and
wherein the one or more circuits being configured to generate the periodic excitation signal comprises the one or more circuits being configured to use the synchronization signal to lock the phase of the generated periodic excitation signal to the phase of the periodic noise.

59. The system of claim 58, wherein the synchronization signal is a line synchronization signal or a frame synchronization signal of the display device.

60. The system of claim 58, wherein the display device comprises a liquid crystal display device, an OLED display device, or a plasma display device.

61. The system of claim 42, further comprising a data store, wherein the one or more circuits are further configured to:
determine the threshold value during a calibration routine of the sensor, and
store the threshold value in the data store, and
wherein accessing the threshold value comprises accessing the threshold value from the data store.

62. The system of claim 61, wherein the calibration routine during which the threshold value is determined is performed when the sensor is manufactured.

63. The system of claim 61, wherein the calibration routine during which the threshold value is determined is only performed once during the lifetime of the sensor.

64. A system for providing cleaned signals in a capacitive touch screen display having a capacitive touch sensor positioned relative to a display device, the system including:
a display device;
a capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix; and
one or more circuits configured to:
receive a synchronization signal from the display device;
configure the touch sensor to have a sensor frame rate equal to a rational multiple of a frame rate of the display device;
determine a phase of periodic noise generated by the display device based on the synchronization signal;
during a first sensor frame of the touch sensor, generate a first periodic excitation signal having a phase that is locked to the determined phase of the periodic noise, and applying the first periodic excitation signal to an excited conductor in the first array;
while the first excitation signal is applied during the first sensor frame, detect a first response signal on a responding conductor in the second array, the responding conductor being capacitively coupled to the excited conductor, and generate, based on the detected first response signal, a first value indicative of a measured capacitance between the excited conductor and the responding conductor;
access a first threshold value;
determine whether the first response signal corresponds to a touch based on a difference between the first value and the first threshold value; and
produce a signal reflecting results of the determination of whether the first response signal corresponds to a touch.

65. The system of claim 64, wherein the synchronization signal is a line synchronization signal or a frame synchronization signal of the display device.

66. The system of claim 64, wherein the display device comprises a liquid crystal display device, an OLED display device, or a plasma display device.

67. The system of claim 64, wherein the one or more circuits include a detector circuit and a sampler circuit, and
wherein the one or more circuits being configured to generate, based on the detected first response signal, a first value indicative of a measured capacitance between the excited conductor and the responding conductor comprises:
the detector circuit being configured to generate a first detector signal based on the first response signal; and
the sampler circuit being configured to sample the first detector signal to arrive at a first value indicative of a measured capacitance between the excited conductor and the responding conductor.

68. The system of claim 64,
wherein the one or more circuits are further configured to:
determine the first threshold value during a calibration routine of the sensor, and
store the first threshold value in a data store, and
wherein the one or more circuits being configured to access the first threshold value comprises the one or more circuits being configured to access the first threshold value from the data store.

69. The system of claim 68, wherein the calibration routine during which the first threshold value is determined is performed when the sensor is manufactured.

70. The system of claim 68, wherein the calibration routine during which the first threshold value is determined is only performed once during the lifetime of the sensor.

71. The system of claim 64,
wherein the one or more circuits being configured to configure the touch sensor to have a sensor frame rate equal to a rational multiple of the frame rate of the display device comprises the one or more circuits being configured to configure the touch sensor to have a ratio of the sensor frame rate to the frame rate of the display device that is equal to x:y, where x and y are integers and x is greater than one, and
wherein the one or more circuits are further configured to:
during a second sensor frame of the touch sensor that occurs after the first sensor frame, generate a second periodic excitation signal having a phase that is locked to the determined phase of the periodic noise, and apply the second periodic excitation signal to the excited conductor;
while the second excitation signal is applied during the second sensor frame, detect a second response signal on the responding conductor, and generate, based on the detected second response signal, a second value indicative of a measured capacitance between the excited conductor and the responding conductor;
access a second threshold value, the second threshold value being different from the first threshold value;
determine whether the second response signal corresponds to a touch based on a difference between the second value and the second threshold value; and
produce a signal reflecting results of the determination of whether the second response signal corresponds to a touch.

72. The system of claim 71, further comprising a data store, wherein the one or more circuits are further configured to:
determine the first threshold value and the second threshold value during a calibration routine of the sensor, and
store the first threshold value and the second threshold value in the data store,
wherein the one or more circuits being configured to access the first threshold value comprises the one or more circuits being configured to access the first threshold value from the data store, and
wherein the one or more circuits being configured to access the second threshold value comprises the one or more circuits being configured to access the second threshold value from the data store.

73. The system of claim 72, wherein the calibration routine during which the first threshold value and the second threshold value are determined is performed when the sensor is manufactured.

74. The system of claim 72, wherein the calibration routine during which the first threshold value and the second threshold value are determined is only performed once during the lifetime of the sensor.

75. The system of claim 64, wherein the one or more circuits being configured to generate, based on the detected second response signal, a second value indicative of a measured capacitance between the excited conductor and the responding conductor comprises the one or more circuits being configured to:
generate a second detector signal based on the second response signal; and
sample the second detector signal to arrive at the second value indicative of a measured capacitance between the excited conductor and the responding conductor.

76. A system for providing cleaned signals in a capacitive touch screen display having a capacitive touch sensor positioned relative to a display device, the system including:
a display device;
a data store;
a capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix; and
one or more circuits configured to:
receive a synchronization signal from the display device;
configure the touch sensor to have a ratio of a sensor frame rate to a frame rate of the display device that is equal to x:y, where x and y are integers and x is greater than one;
determine a phase of periodic noise generated by the display device based on the synchronization signal;
store x threshold values in the data store, each of the x threshold values usable for determining touches during a respective one of x sequential sensor frames; and
during each nth sensor frame of the x sequential sensor frames, where n is an integer from 1 to x:
generate an nth periodic excitation signal having a phase that is locked to the determined phase of the periodic noise, and apply the nth periodic excitation signal to an excited conductor in the first array;
while the nth excitation signal is applied during the nth sensor frame, detect an nth response signal on a responding conductor in the second array, the responding conductor being capacitively coupled to the excited conductor, and generate, based on the detected nth response signal, an nth value indicative of a measured capacitance between the excited conductor and the responding conductor;
access, from the data store, an nth threshold value;
determine whether the nth response signal corresponds to a touch based on a difference between the nth value and the nth threshold value; and
produce a signal reflecting results of the determination of whether the nth response signal corresponds to a touch.

77. The system of claim 76, wherein at least two of the x threshold values are different from each other.

78. The system of claim 76, wherein each of the x threshold values is different from each other.

79. The system of claim 76, wherein the one or more circuits being configured to generate, based on the detected nth response signal, an nth value indicative of a measured capacitance between the excited conductor and the responding conductor comprises the one or more circuits being configured to:
generate an nth detector signal based on the nth response signal; and
sample the nth detector signal to arrive at an nth value indicative of a measured capacitance between the excited conductor and the responding conductor.

80. The system of claim 76, wherein the one or more circuits are further configured to determine the x threshold values during a calibration routine of the sensor.

81. The system of claim 80, wherein the calibration routine during which the x threshold values are determined is performed when the sensor is manufactured.

82. The system of claim 80, wherein the calibration routine during which the x threshold values are determined is only performed once during the lifetime of the sensor.

83. A system for providing a cleaned signal in a capacitive touch sensor, the system comprising:
a capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix;
means for determining a phase of periodic noise on an input of the capacitive touch sensor;
means for generating a periodic excitation signal having a phase that is locked to the determined phase of the periodic noise; and
one or more circuits configured to:
apply the periodic excitation signal to an excited conductor in the first array;
while the excitation signal is applied, detect a response signal on a responding conductor in the second array, and generate, based on the detected response signal, a value indicative of a measured capacitance between the excited conductor and the responding conductor;
access a threshold value;
determine whether the response signal corresponds to a touch based on a difference between the value and the threshold value; and
produce a signal reflecting results of the determination of whether the response signal corresponds to a touch.

84. A system for providing cleaned signals in a capacitive touch screen display having a capacitive touch sensor positioned relative to a display device, the system including:
a display device;
a capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix;
a receiving circuit configured to receive a synchronization signal from the display device;
means for configuring the touch sensor to have a sensor frame rate equal to a rational multiple of a frame rate of the display device;
means for determining a phase of periodic noise generated by the display device based on the synchronization signal;
means for, during a first sensor frame of the touch sensor, generate a first periodic excitation signal having a phase that is locked to the determined phase of the periodic noise, and applying the first periodic excitation signal to an excited conductor in the first array; and one or more circuits configured to:
while the first excitation signal is applied during the first sensor frame, detect a first response signal on a responding conductor in the second array, the responding conductor being capacitively coupled to the excited conductor, and generate, based on the detected first response signal, a first value indicative of a measured capacitance between the excited conductor and the responding conductor;
access a first threshold value;
determine whether the first response signal corresponds to a touch based on a difference between the first value and the first threshold value; and
produce a signal reflecting results of the determination of whether the first response signal corresponds to a touch.

85. A system for providing cleaned signals in a capacitive touch screen display having a capacitive touch sensor positioned relative to a display device, the system including:
a display device;
a data store;
a capacitive touch sensor including a first array of conductors and a second array of conductors, wherein the conductors in the first array are arranged substantially in parallel with one another, and the conductors in the second array are arranged substantially in parallel with one another, and wherein the conductors in the first array are positioned substantially perpendicular to the conductors in the second array to form a matrix;
a receiving circuit configured to receive a synchronization signal from the display device;
means for configuring the touch sensor to have a ratio of a sensor frame rate to a frame rate of the display device that is equal to x:y, where x and y are integers and x is greater than one;
means for determining a phase of periodic noise generated by the display device based on the synchronization signal; and
one or more circuits configured to:
store x threshold values in the data store, each of the x threshold values usable for determining touches during a respective one of x sequential sensor frames; and
during each nth sensor frame of the x sequential sensor frames, where n is an integer from 1 to x:
generate an nth periodic excitation signal having a phase that is locked to the determined phase of the periodic noise, and apply the nth periodic excitation signal to an excited conductor in the first array;
while the nth excitation signal is applied during the nth sensor frame, detect an nth response signal on a responding conductor in the second array, the responding conductor being capacitively coupled to the excited conductor, and generate, based on the detected nth response signal, an nth value indicative of a measured capacitance between the excited conductor and the responding conductor;
access, from the data store, an nth threshold value;

determine whether the nth response signal corresponds to a touch based on a difference between the nth value and the nth threshold value; and produce a signal reflecting results of the determination of whether the nth response signal corresponds to a touch.

\* \* \* \* \*